Aug. 5, 1947.　　　A. J. MUSSELMAN　　　2,425,116
EXTERNAL CONTRACTING BAND BRAKE
Filed July 4, 1945
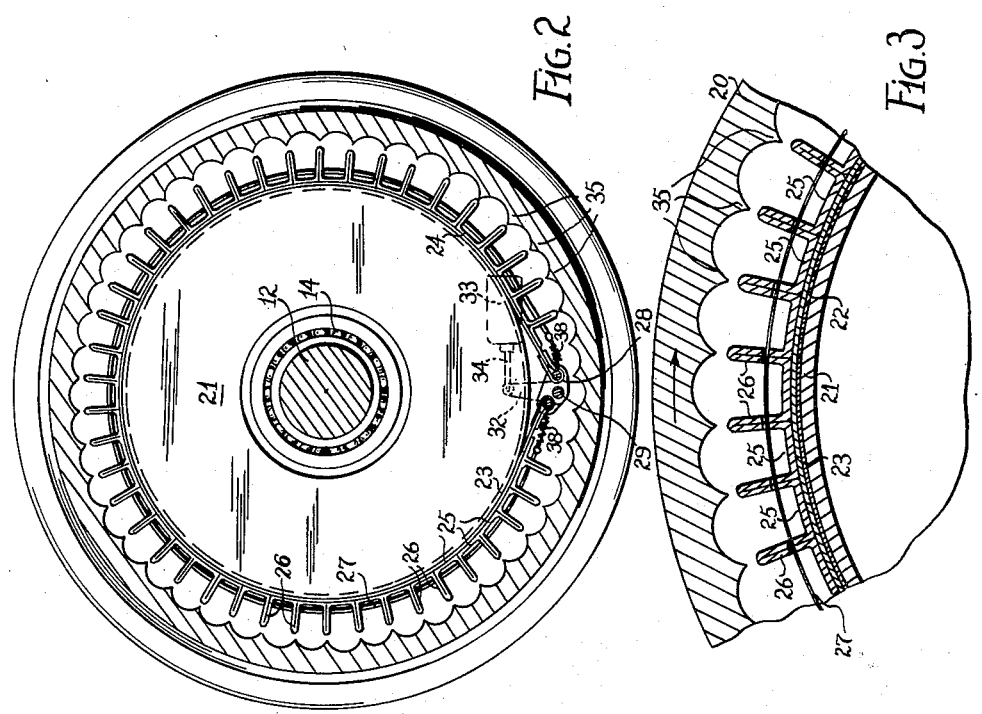
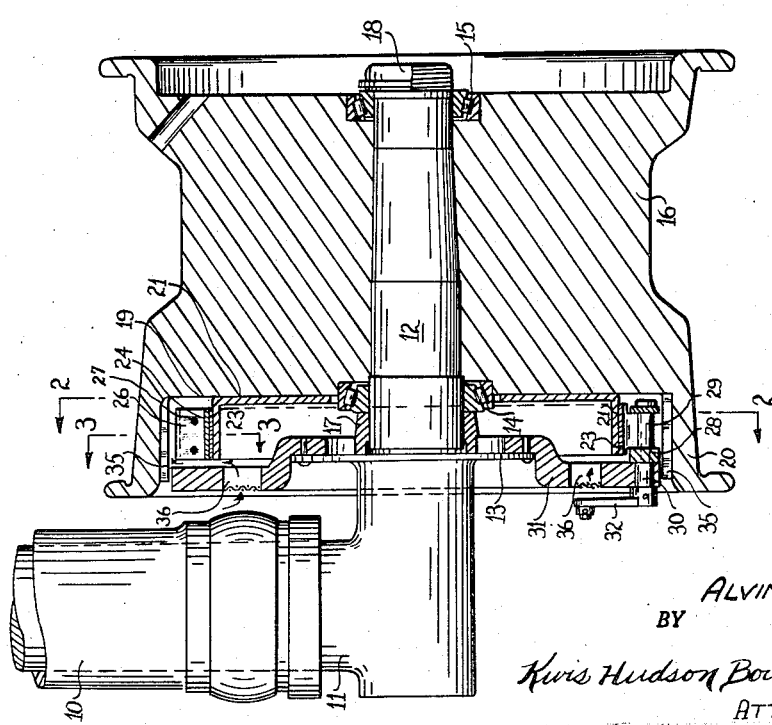
INVENTOR.
ALVIN J. MUSSELMAN
BY
Kwis Hudson Boughton & Williams
ATTORNEYS Patented Aug. 5, 1947

2,425,116

UNITED STATES PATENT OFFICE 2,425,116

EXTERNAL CONTRACTING BAND BRAKE

Alvin J. Musselman, Hudson, Ohio

Application July 4, 1945, Serial No. 603,165

4 Claims. (Cl. 188—77)

This invention relates to improvements in brakes. In one of its aspects the invention has to do with improvements in brakes of the character in which the coacting brake surfaces are two relatively hard materials such as steel and metal coated with hard chromium or other material higher in the hardness scale than steel. In other aspects the invention has to do with features of construction which influence the dissipation of heat from one of the brake members.

One of the objects of the invention is the provision of a brake of the steel against hard chromium type, one of the elements of which is a flexible band.

Another object is the provision of a brake embodying an external contracting band upon which is superimposed a finned cooling band in order to dissipate as rapidly as possible the heat generated in the braking action.

A further object is the provision of means carried by the rotating wheel for inducing air flow over the brake band and its fins for cooling purposes.

Other objects and features of novelty will appear as I proceed with the description of that embodiment of the invention which, for the purposes of the present application, I have illustrated in the accompanying drawing, in which Fig. 1 is an elevational view, largely in vertical section, of an airplane wheel equipped with a brake embodying the present invention.

Fig. 2 is a transverse sectional view taken substantially on the line 2—2 of Fig. 1, and Fig. 3 is a fragmental sectional view on a larger scale, the view being taken substantially on the line 3—3 of Fig. 1.

In Fig. 1 of the drawing I have shown an airplane strut which may comprise relatively slidable members 10 and 11 whose movements with respect to each other are preferably cushioned by conventional means, not shown. Member 11 carries a wheel spindle 12 having a flange 13.

Two antifriction bearings 14 and 15 surround spindle 12 and rotatably support a wheel 16. The inner race of bearing 14 may be spaced from flange 13 by a collar 17, and the inner race of bearing 15 contacts an adjustable nut 18 rotatably mounted on the end of the spindle. The outer races of these two bearings fit into annular recesses formed in the wheel.

The side of wheel 16 facing toward the strut 10, 11 is recessed, as indicated at 19, leaving an annular flange 20. Within recess 19 the wheel carries a brake drum 21 of more or less conventional form and smoothly surfaced on its periphery. This exterior surface is coated with a very hard metallic or mineral material, preferably chromium. Assuming that chromium is used, the coating, indicated at 22 in Fig. 3, is preferably effected by an electroplating operation. It should be firmly bonded to the metal of drum 21 and should be thick enough to present an uninterrupted surface regardless of any slight inaccuracies in the surface of the drum itself. As specified in my prior patent No. 2,167,551, dated July 25, 1939, the thickness of the coating should be of the order of .001 of an inch, which I term a hard chromium coating, as distinguished from a coating of the order of .0001 of an inch which has little effect other than to prevent corrosion.

If the chromium is applied to the drum, in accordance with the present invention, the braking action is smooth, soft and quiet. In conventional brakes the vibration and squealing which are frequently evident in brake action are due to alternate gripping and releasing in rapid recurrence. This vibration and squealing are not perceptible in the operation of my brake. I do not know with certainty to what this beneficial result should be attributed, but I believe it is due to the fact that the smoothness of the braking surface, particularly after the brake has been operated for a time, results in the alternate gripping and releasing of the brake occurring in such rapid sequence that the vibration is imperceptible and that the sound is of such high frequency as to be out of the range of human bearing. The operation of the brake may be aptly described as velvety.

In connection with the drum 21 and its coating 22 I employ an external contracting brake band 23 of flexible sheet steel, preferably hardened. It may be contracted by any suitable means, that shown herein by way of illustration comprising a lever 28 fixed upon a rock shaft 29 which is oscillatable in a bearing 30 carried by a cover plate 31 that is secured to the flange 13 of wheel spindle 12. The outer end of shaft 29 has fixed thereto a crank 32 which may be moved toward or away from brake setting position by any suitable means, such as a hydraulic cylinder 33 containing a piston, not shown, on the end of a connecting rod 34.

The brake of this invention is capable of taking very heavy loads, as compared with conventional brakes heretofore employed. Consequently a great amount of heat is generated in the braking action. While the brake will stand up under such high temperatures, it is desirable to dissipate the heat as rapidly as possible, and to that end I surround the brake band 23 with a flexible sheet metal cooling band 24, preferably formed of copper, and comprising a multiplicity of elements 25 contacting the band 23, these elements being connected together by integral folds 26 constituting cooling fins. The band 24 should hug the band 23 snugly, making good contact over a relatively great area, so that heat may be transmitted efficiently. Any suitable means may be employed for effecting this close engagement, for example the folds 26 may be perforated near their inner ends and wires 27 may be strung through these perforations, the ends of the wires being attached to tension springs 30, as indicated in Fig. 2 of the drawing.

The annular flange 29 enclosing a space within which are accommodated the drum 21, the cover 31 and the bands 23—24, has a series of inwardly projecting ribs 35. When the wheel runs upon the ground these rapidly moving ribs act as air vanes to induce flow of air through screened openings 36 in cover plate 31, then radially outwardly over contacting elements 25 and fins 26 of the flexible cooling band, and then laterally outward beyond the periphery of cover plate 31.

Brakes which are subjected to unusually heavy loads, those for large airplanes especially, encounter extremely high temperatures and are subject to rapid deterioration on that account. The brake of the present invention is able to combat this difficulty better than those conventionally employed for the purpose because both brake members have high melting points. That of steel is of the order of 2785° F. and that of chromium is of the order of 3500° F. Both metals are hard, but there is a wide difference between them in this respect. The hardness of steel in Moh's scale is 4.3 and that of chromium is 9. Certain other materials, topaz, tungsten and sapphire for example, are also much higher in the hardness scale than steel and could be substituted for chromium in the present invention, but their use at the present time is not practical.

Having thus described my invention, I claim:

1. In a brake of the character described, a rigid drum having a hard chromium coating on its exterior surface, a flexible steel brake band surrounding the drum, means for contracting said brake band to grip the drum and effect braking effort thereupon, and a finned cooling band surrounding and gripping said brake band.

2. In a brake of the character described, a rigid drum, a flexible brake band surrounding the drum, a cooling band having integral outwardly extending fins, said cooling band surrounding and gripping said brake band, and means for contacting said brake band to grip the drum and effect braking effort thereupon.

3. In a brake of the character described, a rigid drum having a hard chromium coating on its exterior surface, a flexible sheet metal brake band surrounding the drum, a sheet metal cooling band surrounding and engaging said brake band and comprising a multiplicity of interconnected elements adapted to engage the brake band, said interconnections consisting of integral folds constituting outwardly extending fins.

4. In apparatus of the character described, a wheel, a rigid drum rotatable with said wheel, a flexible band surrounding the drum adapted to be contracted to effect braking effort upon the drum, cooling means for said band comprising outwardly extending fins, said wheel having a flange overhanging said band and said fins, and inwardly extending ribs on said flange for inducing air flow over said band and fins.

ALVIN J. MUSSELMAN.

REFERENCES CITED

The following references are of record in the file of this patent:

UNITED STATES PATENTS

| Number | Name | Date |
| --- | --- | --- |
| 1,818,100 | Shields | Aug. 11, 1931 |
| 2,167,551 | Musselman | July 25, 1939 |
| 2,248,684 | Levy | July 8, 1941 |